United States Patent
Matula et al.

(10) Patent No.: US 11,722,601 B2
(45) Date of Patent: Aug. 8, 2023

(54) CONTENT CODED ZIP TONES FOR AGENTS AND CONFERENCE CALL PARTICIPANTS, AND USER-ADJUSTABLE TONE ATTRIBUTE

(71) Applicant: Avaya Management L.P., Durham, NC (US)

(72) Inventors: Valentine C. Matula, Granville, OH (US); Emily E. Matula, Pearland, TX (US); Shamik Shah, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/094,264

(22) Filed: Nov. 10, 2020

(65) Prior Publication Data

US 2022/0150355 A1    May 12, 2022

(51) Int. Cl.
  *H04M 3/00*   (2006.01)
  *H04M 3/51*   (2006.01)
  *H04M 19/04*  (2006.01)
  *H04M 3/56*   (2006.01)

(52) U.S. Cl.
  CPC .......... *H04M 3/5183* (2013.01); *H04M 3/56* (2013.01); *H04M 19/041* (2013.01); *H04M 19/042* (2013.01)

(58) Field of Classification Search
  CPC .... H04M 3/5183; H04M 3/56; H04M 19/041; H04M 19/042
  See application file for complete search history.

(56) References Cited

U.S. PATENT DOCUMENTS

| | | | | |
|---|---|---|---|---|
| 4,449,017 A * | 5/1984 | Burke | ..................... | H04M 1/00 379/309 |
| 5,621,789 A * | 4/1997 | McCalmont | ............ | H04M 3/36 379/265.06 |
| 5,729,602 A * | 3/1998 | Sullivan | ................ | H04M 1/652 379/282 |
| 2002/0031205 A1* | 3/2002 | Kicklighter | ........... | H04M 3/005 379/32.01 |
| 2011/0142037 A1* | 6/2011 | Yang | ....................... | H04M 3/02 370/352 |
| 2012/0231850 A1* | 9/2012 | Shore | ..................... | H04M 1/724 455/566 |

* cited by examiner

*Primary Examiner* — Rasha S Al Aubaidi
(74) *Attorney, Agent, or Firm* — Stevens & Showalter LLP (57) ABSTRACT

Providing zip tones for a call includes receiving, by a computer of a contact center, a call-related event for the call; generating, by the computer of the contact center, one zip tone from among a plurality of different zip tones based on the call-related event, wherein the one zip tone is indicative of one or more attributes of the call-related event that are different than other call-related events; transmitting, by the computer of the contact center, the one zip tone to a device associated with a call participant of the call; and requesting, by the computer of the contact center, customization instructions for one or more of the plurality of different zip tones

18 Claims, 4 Drawing Sheets

CONTENT CODED ZIP TONES FOR AGENTS AND CONFERENCE CALL PARTICIPANTS, AND USER-ADJUSTABLE TONE ATTRIBUTE

BACKGROUND

Field

Embodiments of the present disclosure generally relate to a system and method for providing zip tones to agents or call participants, wherein the zip tones can be customized and/or personalized.

Description of Related Art

In a contact center, for example, agents may receive either a tone in their ear when receiving a new call, or may get a spoken (whisper) announcement. They may also get a tone or announcement during a call, such as "supervisor joined", or "wrap up call", or "transfer to help queue". On conference calls, especially 'open bridge' calls for rapid response teams, tones used in current implementations may have multiple tones (low, high—indicating a joined person)—but further customization of zip tones is not contemplated other than, possibly, allowing some tones while disallowing (or preventing) other tones. Spoken announcements are another typical manner to inform an agent about a call. However, there are issues with spoken announcements.

In telephony, a zip tone is typically a tone an automatic call distribution system makes to alert an agent in a contact center environment that they are about to be connected to a customer. A zip tone can also be used in the context of a conference call to indicate a call event during the conference call.

SUMMARY

One aspect of the present disclosure relates to a computer implemented method for providing zip tones for a call, the method comprising: receiving, by a computer of a contact center, a call-related event for the call; generating, by the computer of the contact center, one zip tone from among a plurality of different zip tones based on the call-related event, wherein the one zip tone is indicative of one or more attributes of the call-related event that are different than other call-related events; transmitting, by the computer of the contact center, the one zip tone to a device associated with a call participant of the call; and requesting, by the computer of the contact center, customization instructions for one or more of the plurality of different zip tones.

According to this aspect, the call can include a multi-party open bridge call and the call-related event is associated with a party joining or leaving the open bridge call or the call can include an incoming call to the contact center and the call participant is an agent of the contact center. Furthermore, the one zip tone may relate to a queue associated with the incoming call.

This aspect also includes concurrently transmitting, by the computer of the contact center, the one zip tone and an audio portion of the call to the device associated with the call participant.

As for customization, the customization instructions may relate to a volume associated with playing back any of the plurality of zip tones. Furthermore, the plurality of zip tones may each be uniquely encoded as multiple tones and the customization instructions can relate to modifying, adapting, or changing a relative duration of the multiple tones (to one another) from a system-default relative duration or a previously-set relative duration of the multiple tones (to one another); or the customization instructions can relate to modifying, adapting, or changing a relative frequency of the multiple tones (to one another) from a system-default relative frequency or a previously-set relative frequency of the multiple tones (to one another). Also, the customization instructions can relate to a playback speed of the multiple tones.

Another aspect of the present invention relates to a system to provide zip tones for a call associated with a contact center, comprising a memory storing executable instructions and a processor in communication with the memory. In particular, executable instructions when executed by the processor cause the processor to: receive a call-related event for the call; generate one zip tone from among a plurality of different zip tones based on the call-related event, wherein the one zip tone is indicative of one or more attributes of the call-related event that are different than other call-related events; transmit the one zip tone to a device associated with a call participant of the call; and request customization instructions for one or more of the plurality of different zip tones.

According to this aspect, the call can include a multi-party open bridge call and the call-related event is associated with a party joining or leaving the open bridge call or the call can include an incoming call to the contact center and the call participant is an agent of the contact center. Furthermore, the one zip tone may relate to a queue associated with the incoming call.

This aspect can also include the processor concurrently transmitting the one zip tone and an audio portion of the call to the device associated with the call participant.

As for customization, the customization instructions may relate to a volume associated with playing back any of the plurality of zip tones. Furthermore, the plurality of zip tones may each be uniquely encoded as multiple tones and the customization instructions can relate to modifying, adapting, or changing a relative duration of the multiple tones (to one another) from a system-default relative duration or a previously-set relative duration of the multiple tones (to one another); or the customization instructions can relate to modifying, adapting, or changing a relative frequency of the multiple tones (to one another) from a system-default relative frequency or a previously-set relative frequency of the multiple tones (to one another). Also, the customization instructions can relate to a playback speed of the multiple tones.

DETAILED DESCRIPTION

As mentioned above, in a contact center, for example, devices associated with agents may receive either a tone in their ear when receiving a new call, or may receive a spoken (whisper) announcement. The tone received by the agent's device may relate to a tone or announcement during a call, such as "supervisor joined", or "wrap up call", or "transfer to help queue". On conference calls, especially 'open bridge' calls for rapid response teams, the tones may include multiple tones (low, high—indicating a joined person)—but, as mentioned, further customization of zip tones is not contemplated other than, possibly, allowing some tones while disallowing (or preventing) other tones. Spoken announcements are another typical manner to inform an agent about a call. However, there are issues with spoken announcements.

Embodiments in accordance with the principles of the present disclosure are described herein with respect to a contact center and the servers, agents, and devices of contact centers. However, one of ordinary skill will readily recognize that this environment is described merely as a way to facilitate explanation of the present disclosure and the principles described herein can be implemented in other environments without departing from the scope of the present disclosure. For example, a conference call controller or server providing a conference call bridge may provide customized zip tones as described herein. Thus, when the phrase "a device associated with an agent" is used herein, embodiments also contemplate that the device can be associated with a call participant such as a participant of a conference call.

Spoken announcements, in addition to zip tones, are also popular because they can be informative. For example, if a call being received is from the baggage claim queue, the spoken announcement may be provided to an agent's device so that the agent hears "baggage claim" in their ear, or might hear "international reservation" for an appropriate queue, etc., or "a participant has joined the call".

However, there are issues with spoken announcements:
A spoken announcement can take significantly longer than a simple tone or set of tones, and thus slow down contact center (CC) call handling.
A spoken announcement during a call typically "blanks out" the conversation or could be added to the conversation—but the agent or conference call participant may either miss some customer/conference audio, or have a confusing set of two voices speaking at the same time.
A spoken announcement may be difficult to understand by a person who does not understand the spoken prompt language—in this case that person must memorize the phrase without necessarily understanding its meaning.
Updating system with new audio files can have long lead times and require additional resources In contrast to spoken announcements, using zip tones for CC agents may result in some loss of the ability to convey complex information. For example, for conference call end users, possible tone sequences are limited and may appear to be without any order or basis that is directly tied to a call event related to a particular zip tone.

Thus, embodiments in accordance with the present disclosure propose to use coded tones to represent the queue or the action to be taken by the agent, or a situation in a conference call. Furthermore, a standardized set of tone patterns may be defined and used across a contact center operation or a logical portion of a contact center operation. A "logical portion" simply means a set of contact center resources that share a similar function such as "flight reservations" and recognition that a single contact center can have multiple such logical portions. Thus, the zip tones contemplated herein can include zip tones defined for the entire contact center as well as a subset, or a set of zip tones, customized for each logical portion of the contact center. As described in detail below, one example would be to use Morse Code-based tones for "B" for baggage claim, "I" or "I R" for International reservations, etc.

Furthermore, embodiments in accordance with the present disclosure contemplate allowing an agent, or possibly a supervisor, to adjust several features of a tone sequence as a way to further customize and personalize zip tones. As used herein, customized zip tones are zip tones that have been modified or selected from a set of default zip tones that can be used in the absence of any customization. Further customization can be accomplished and referred to as personalized zip tones which an agent or call participant can define and modify to provide zip tones that are considered particularly useful, meaningful, and easy-to-understand by that agent or call participant.

As used herein, a zip tone is typically considered to comprise a plurality of different tones arranged in a sequence. Each of the different tones of the sequence will have a default duration and a default pitch (or frequency). The duration of each of the different tones of the sequence can be objectively determined or can be relative to one another. For example, if a zip tone sequence is representative of a Morse code letter, or letters, then the different tones can be considered to be either a "dot" or a "dash". In this instance, a "dot" may by default be one-third the duration of a "dash". Embodiments in accordance with the present invention contemplate that an agent can customize the duration of a dot, the duration of a dash, or the relative ratio of duration (e.g., ⅓) between a dot and a dash. Furthermore, the defined duration ratio may remain the same such that if an agent customizes the duration of a dash, then the duration of a dot may be automatically adjusted as well so as to maintain that defined duration ratio.

Embodiments of the present disclosure will be illustrated below in conjunction with an exemplary communication system, e.g., the Avaya Aura® system. Although well suited for use with, e.g., a system having an Automatic Call Distribution (ACD) or other similar contact processing switch, embodiments of the present disclosure are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

Figure 1:
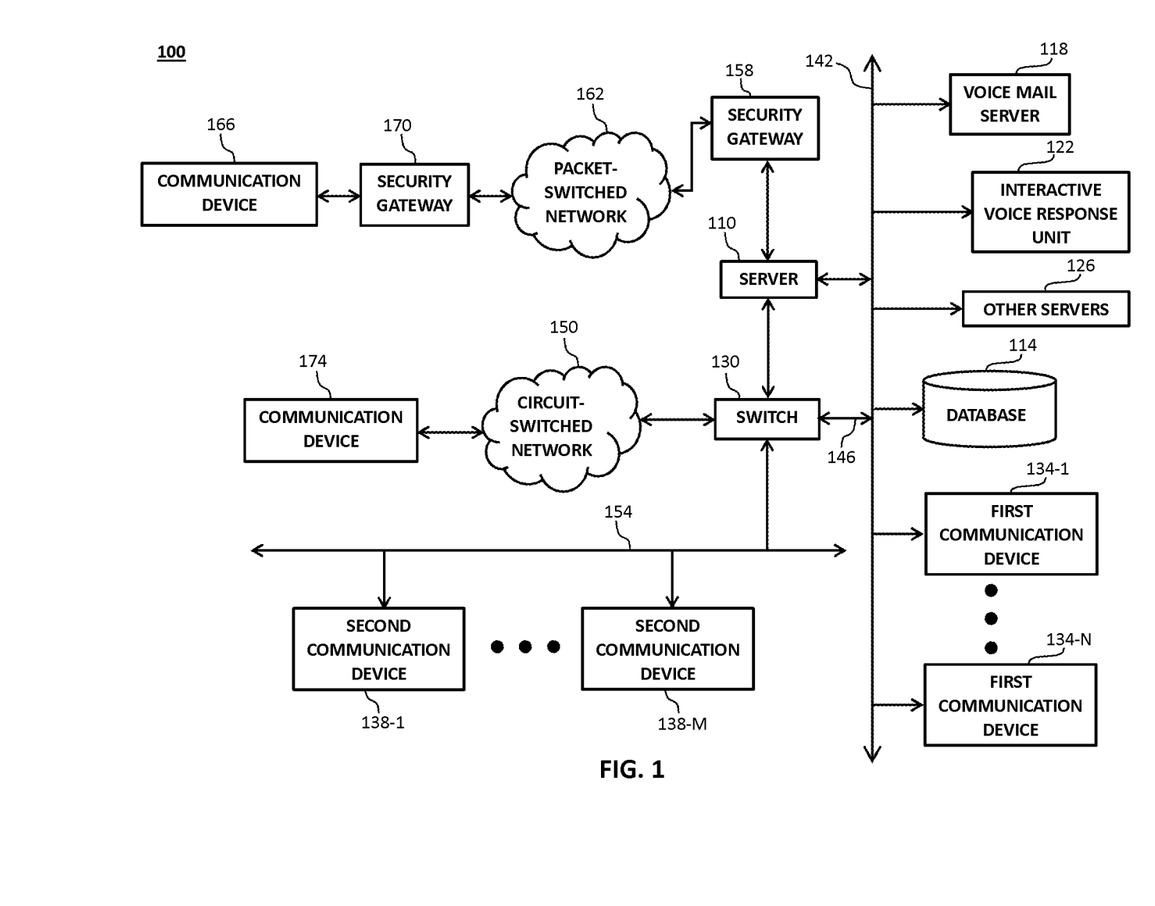
FIG. 1 shows an illustrative embodiment of the present disclosure.

A module that performs a function also may be referred to as being configured to perform the function, e.g., a data module that receives data also may be described as being configured to receive data. Configuration to perform a function may include, for example: providing and executing computer code that performs the function; providing provisionable configuration parameters that control, limit, or enable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; energizing a circuit that performs the function (e.g., providing power to a transceiver circuit in order to receive data); and so forth FIG. 1 shows an illustrative embodiment of the present disclosure. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present disclosure, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present disclosure, the security gateway 158 (as shown in FIG. 1A) may be a G700 Media Gateway™ from Avaya Inc., or may be implemented as hardware such as via an adjunct processor (as shown) or as a chip in the server 110.

The switch 130 and/or server 110 may be any architecture for directing contacts to one or more communication devices. In some embodiments of the present disclosure, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the 4600 Series IP Phones™ from Avaya, Inc., IP softphones such as an IP Softphone™ from Avaya Inc., Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of the present disclosure do not require any particular type of information transport medium between switch, or server and first and second communication devices, i.e., the embodiments of the present disclosure may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 166 via a security gateway 170, and the circuit-switched network 150 with an external second communication device 174. In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1 are for purposes of illustration only and should not be construed as limiting embodiments of the present disclosure to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 2:
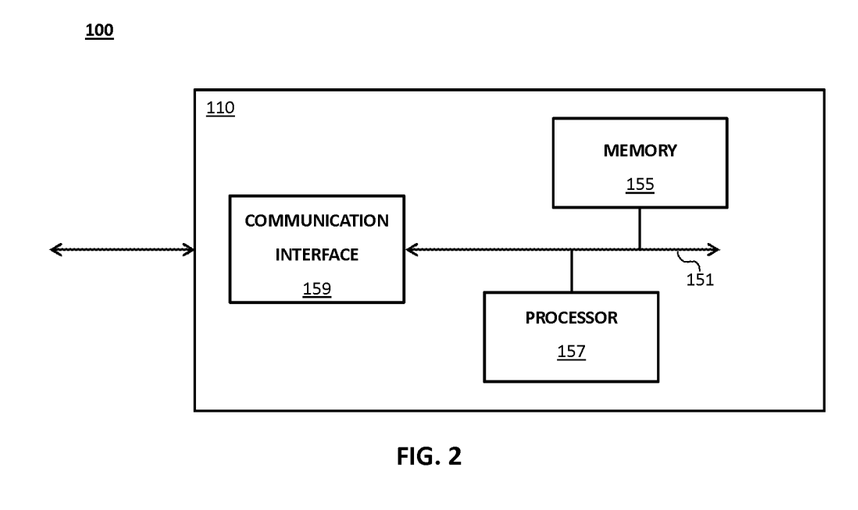
FIG. 2 illustrates at a relatively high-level hardware abstraction a block diagram of a server such as the server 110, in accordance with an embodiment of the present disclosure.

FIG. 2 illustrates at a relatively high-level hardware abstraction a block diagram of a server such as the server 110, in accordance with an embodiment of the present disclosure. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood that the principles of embodiments of the present disclosure apply to other network architectures. For example, embodiments of the present disclosure apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present disclosure do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Example customizations and personalization of zip tones, as discussed herein, can be described in the context of a Morse code environment. This environment, however, is provided by way of example and is more generically described as a code with symbols (e.g., a dot and a dash) such that a particular sequence of symbols represents a letter, or a word, or some other data that is indicative of a call event. A call event can, for example, include identifying a queue from which an incoming call is being received or an occurrence of some event during a conference call. Also, such customization and personalization can be accomplished by a system administrator, a supervisor, a call participant, an agent, or a combination thereof. Example personalization and customizations, thus, can include:

1. Set an overall speed of tone sequence playing (in the same way that beginning ham radio operators may run at 5 words/min (25 char/min) equivalent speed, and then over time, ramp up to 2 to 5 times as fast.)
2. Adjust the volume level of the tone.
3. Adjust the frequency or frequencies that make up each of the tones within a sequence of tones that comprise one zip tone.
4. Adjust the relative duration of the "dot" and the "dash" of the tone. This is sometimes referred to as "heaviness of the hand" in ham radio and more generally can refer to adjusting the relative duration of different tones within a sequence of zones that comprise a zip tone.
5. Allow for bleed through of voice announcement through tones such that both can be heard by an agent or call participant, or alternatively blank the voice audio announcement during tone playing.
6. Each agent can personalize their own sequences (mix of dots and dashes) that mean something to the end user (e.g., high pitch dash followed by low pitch dash sounds like the "door closing warning" bell on a NYC subway, signifying the NYC office is calling in). This is just one example, but for a particular agent, there may be sounds or a sequence of sounds that the agent personally associates with a particular time, location, or event. Thus, the agent can define a zip tone that resembles or mimics those sounds such that when the device of the agent receives a personalized zip tone, the agent readily understands that the accompanying incoming call is related to that particular time, location or event. Another example is if the agent, or call participant, usually participates in a call in which a supervisor or participant from a geographical region (e.g., India, Japan, etc.) is joined to a conference call. The agent can define a zip tone that has sounds or tones that the agent generally relates to that geographical region. Thus, when the personalized zip tone indicates a party has joined a call, it may indicate to the agent that the person joining the call is from an office in a particular geographical region.

7. An agent can define an ability to save, retrieve and flush, the last n number of tones received. This will help ensure that they receive and understand the appropriate message associated with that zip tone just in case the agent missed the zip tone or got confused. The storage could be locally at the agent's device or at a central server.

8. An agent can define a method to persist the last received tone such as, for example, a method to display the dots and dashes or its equivalent symbol/meaning on the agent's screen so that the agent can be reminded of the last message (i.e., zip tone) they received. In other words, in the Morse code example, each tone (e.g., dot or dash) in a sequence that define a zip tone can correspond with a predefined, respective visual symbol or representation. An agent's screen can be used to visually display those symbols so as to display the last-received zip tone or the last received tones. The zip tone may also correspond to a symbol or summarized data such as the letter "H" or that a participant left a conference call. The summarized data which corresponds to the zip tone can be visually displayed on an agent's display screen as well. For voice only participants, they can press a number or a sequence on a keypad of their device to get the last-received tone.

In accordance with the principles of the present disclosure, some benefits include: a) the customization and personalization is tunable for best understanding by an agent or conference call participant. The tones (such as "dot dot dot dot" for Help Line (because d-d-d-d is letter H) is easily memorizable by anyone from any language; b) the technology is applicable to call start, call interrupt, and instructions to participants during a conference call especially a "team event" call such as a rapid response/crisis response team call or voice bridge; c) agents could have the option of choosing tones and/or creating tone sequences or announcements on a per situation basis—standardized tones if tones are used, but voice prompts could be used as well for any/select situations—especially uncommon situations; and d) the zip tones and sequences can be updated by contact center personnel in real-time, and require less resources than recording new zip tones or whisper files.

Figure 3:
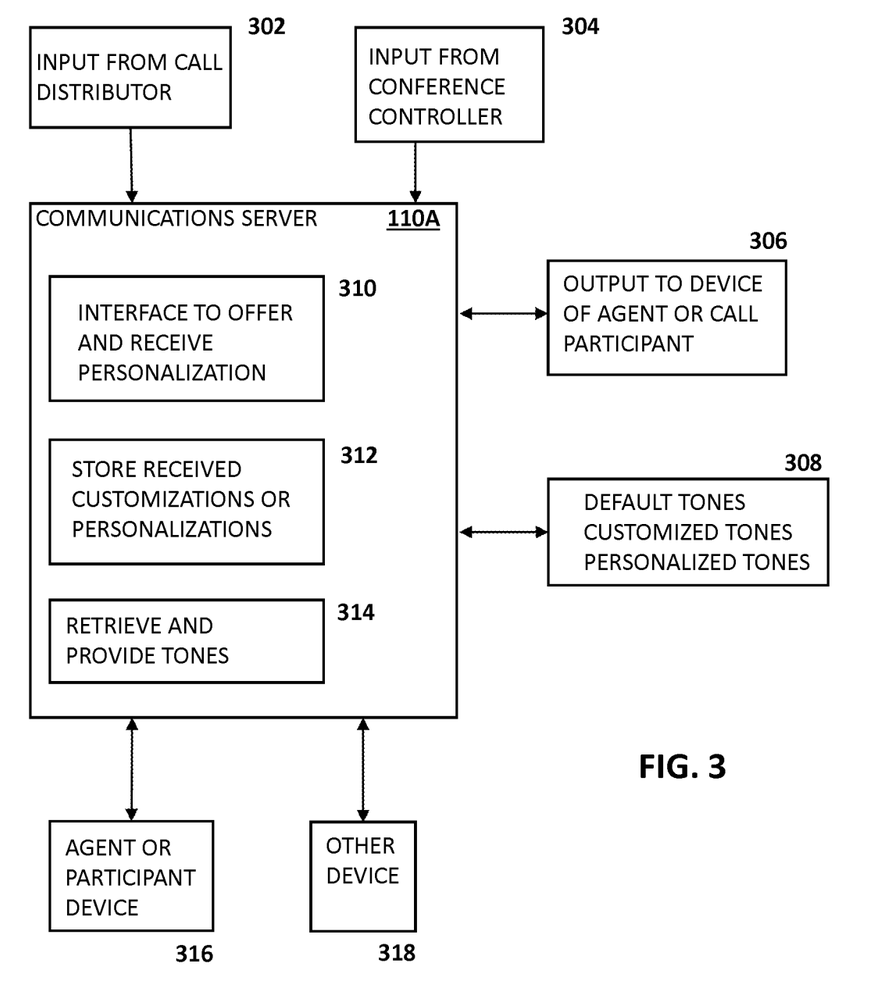
FIG. 3 depicts a more detailed schematic view of a communications server, such as the server of FIG. 2, in accordance with the principles of the present disclosure.

FIG. 3 depicts a more detailed schematic view of a communications server, such as the server of FIG. 2, in accordance with the principles of the present disclosure. In FIG. 2 the server architecture is label "110" but similar architecture can be used to implement the server "110A" of FIG. 3.

Also, the communications server 110A is shown as a separate server than that of server 110 in FIG. 1 and FIG. 2. However, the functionality of server 110A can be integrated into the server 110 as well by virtue of various modules applications and hardware that are part of the server 110.

The server 110A includes modules or applications that when executed provide the functionality described above with respect to customizing and personalizing zip tones as well as providing such zip tones during or prior to a call.

As such, the server 110A includes a module that provides a user interface to offer and receive zip tone customization information. The user interface can present a user with a variety of predefined tones from which the user can select and associate each of the tones with a predefined call event. In the context described herein, a zip tone can be a single tone or a sequence of different tones. A call event can include events that occur during a conference call or information about the context of an incoming call such as, for example, a queue from which the incoming call is received or an inquiry to the agent asking them if they want to transfer the call (once it is received) to a different queue, agent, or supervisor. Thus, the user interface can allow the user to select different tones and arrange them in a sequence to define a personalized zip tone. The user interface can also allow a user to define zip tones of different frequencies and duration from scratch rather than select from a list of predefined tones. The user interface can also allow the user to define one or more personalizations about an already created zip tone as discussed above with relation to the eight example personalizations or customizations.

The server 110a includes a module or application 312 that then stores the personalized information about zip tones in a database 308. The personalized and/or customized zip tone information is stored in such a way as to associate the information with a particular user, agent, or potential call participant. Thus a module or application 314 can retrieve personalized zip tones from the storage 308 for a particular agent or user when an incoming call is routed to a device associate with the agent or that user is participating in a conference call.

Within the context of a contact center, for example, input 302 from a call distributor may be received for an incoming call and identify a device of an agent to which that incoming call will be routed. There may, alternatively, be input 304 from a conference call controller or bridge that identifies a call event that occurs during an ongoing conference call. Those inputs are provided to, or received by, the server 110A so that the modules and applications of the server 110A can identify the call participant or agent, determine the call event represented by the inputs (either 302, 304), identify the appropriate zip tone from the storage 308 and then use an output module 306 to provide that zip tone to a device being used by the call participant or the agent.

The storage 308 can include a number of different zip tones which can be arranged in a hierarchical nature. For example, default zip tones can be defined for a contact center and these default zip tones can be used if no customized or personalized zip tones are defined. There may also be custom zip tones that apply to all agents or call participants in a portion of a contact center such that these customized zip tones are used in conjunction with the default zip tones. Then, in accordance with the principles of the present disclosure, there are personalized zip tones that can override the use of default zip tones or customized zip tones for a particular agent or call participant.

FIG. 3 depicts two different types of devices. First, there are the devices 316 used by the agent or call participant to engage in calls. In addition there are devices 318 that may be available to an agent or call participant that are capable of communicating with the server 110. Either of these two types of devices can be used to communicate with the user interface module 310 so that an agent, supervisor, administrator, call participant, etc. can define and/or create zip tones that can be stored in the storage 308.

Figure 4:
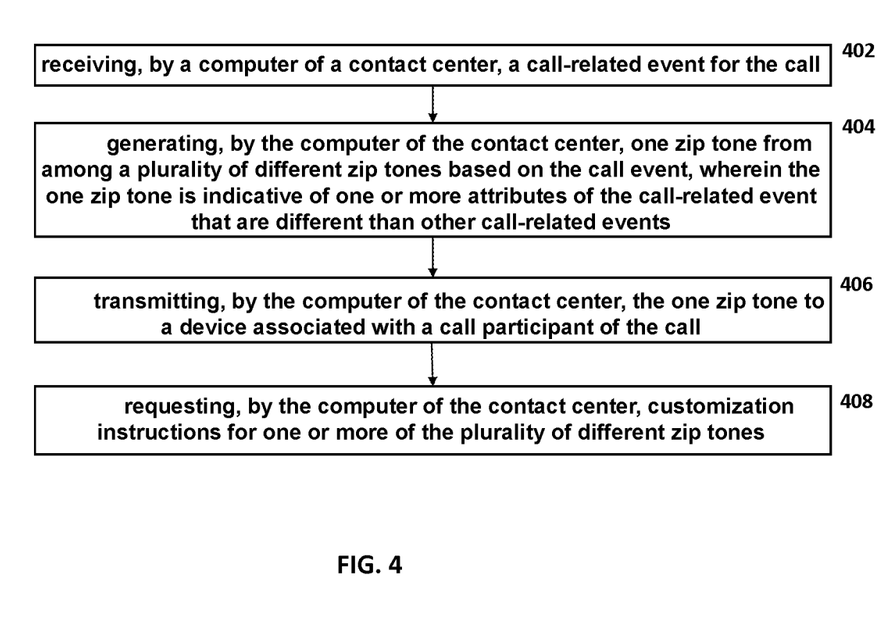
FIG. 4 depicts a high-level flowchart of an example method in accordance with the principles of the present disclosure.

FIG. 4 depicts a high-level flowchart of an example method in accordance with the principles of the present disclosure of a computer implemented method for providing zip tones for a call. As discussed above, present contact center environments utilize zip tones and voice announcements to indicate the occurrence of certain call events and to provide these zip tones and announcements to devices associated with call participants. However, personalization and customization of zip tones in accordance with the principles of the present disclosure has not been contemplated. The method described herein in FIG. 4 begins in step 402 with a computer of a contact center receiving a call-related event for the call. The server can be the server 110 or the server 110A described above and the call event can be related to an event for a conference call or be related to an incoming call that is being routed to a device associated with an agent.

The method continues in step 404 with the computer of the contact center, generating one zip tone from among a plurality of different zip tones based on the call event, wherein the one zip tone is indicative of one or more attributes of the call-related event that are different than other call-related events. Referring back to FIG. 3, the server can select an appropriate zip tone from the storage 308 so that an output module 306 can generate that zip tone. The zip tone is associated with a particular agent or user but is also associated with the particular call-related event. The call-related event will include attributes that differentiate it from other call-related events. As described above, the attributes can relate to a user joining or leaving a conference call or identify a queue from which an incoming call is being received. Even within the same queue, an incoming call may have contextual information such as the importance of a customer or the amount of time they have been waiting. The zip tone for each of these scenarios may be different.

Once the one zip tone is generated, such as being received from the storage 308, the method continues in step 406 with the computer of the contact center transmitting the one zip tone to a device associated with a call participant of the call. Furthermore, in accordance with the principles of the present disclosure, the method of FIG. 4 also includes, in step 408, the computer of the contact center requesting customization or personalization instructions for one or more of the plurality of different zip tones. The computer may initiate such a request when a user or agent logs into the server 110 or 110A or any of the other systems of the contact center of FIG. 1. Additionally, or alternatively, the user (via devices 316 or 318 can communicate with the user interface module or application 310 and during this communication, the module 310 can request instructions on how to personalize one or more zip tones and store those customized or personalized zip tones for later use. The instructions can include updating an existing personalized (or default) zip tone for a user and call event, can include selecting one or more predefined tones that can be assembled into a particular sequence of one or more tones, or can include techniques for the user to define their own tones (pitch, duration, volume, etc.) and assemble them into a sequence of one or more tones.

In some embodiments, the call comprises a multi-party open bridge call and the call-related event is associated with a party joining or leaving the open bridge call. In other embodiments, the call comprises an incoming call to the contact center and the call participant is an agent of the contact center and the one zip tone relates to a queue associated with the incoming call.

In other embodiments, the server 110 or 110A can concurrently transmit the one zip tone and an audio portion of the call to the device associated with the call participant.

As for customization or personalization of zip tones, the customization instructions can, among other things, relate to a volume associated with playing back any of the plurality of zip tones. As described above, the each of the plurality of zip tones can be each uniquely encoded as multiple tones. Accordingly, the customization instructions can relate a relative duration of the multiple tones and/or the customization instructions can relate to a relative frequency of the multiple tones and/or wherein the customization instructions relate to a playback speed of the multiple tones. The user interface module or application 310 can allow robust customization and personalization of the available zip tones. For example, based on past knowledge collected by contact center servers and inputs from subject matter experts, the call events that an agent or call participant can expect to encounter can be identified, categorized and stored by the server 110A as part of the user interface application 310 or in a separate library or database (not shown) that is accessible by the user interface application 310. A call event can include an action such as receiving an incoming contact from a particular queue, prompting the agent to determine if the agent would like to transfer the contact in various allowed ways (e.g., to a supervisor, another agent, another queue, an ICR system, etc.). The call event can also relate to conference calls and be associated with a party leaving or joining a call, asking for permission to be in charge of the call or a present portion of the call, asking to go off-line for a private side discussion, etc. The stored call events may also include an identification of people, organizations, or offices that the agent or call participant is likely to encounter. Thus, the user interface application 310 can provide a display, list, or other database of call events from which the agent can select one for customization or personalization. A call event may include both an action and an identity of an individual associated with that action or the call event may include simply an action. Once a call event is selected, the agent or call participant can associate a zip tone with that call event. As one example, a first zip tone can be selected and associated with a supervisor from the India office joining a conference call and a second zip tone can be selected and associated with a supervisor from the Japanese office joining a conference all. The library of call events may not happen to include a call event or an identity of an individual for which that agent or call participant may wish to personalize a zip tone. Thus, the user interface application 310 can allow the agent or call participant to add or define a new call event that may include a new action, a new identity of a person (or office, etc.), or both. Once a call event is selected or a new call event defined, then the user interface application 310 will allow the agent or call participant to identify and select a zip tone to associate with that call event. The server 110A can include a database 308 of available zip tones that have been predetermined, customized by other entities or personalized by an agent or call participant. The module or application 312 shown in FIG. 3 can operate in conjunction with the user interface application 310 to associate a call event with one of the zip tones from the database 308 and also to store this association in such a manner that the call event, zip tone (personalized or otherwise), and the agent or call participant become associated with one another to define a zip tone that is presented to the device of the agent when a particular call event occurs. Once the agent has selected a call event using the interface application 310, the application 312 can present the agent with a list or description of available zip tones in the database 308 from which the agent can select one. Thus, the selected zip tone and the selected call event can be associated with one another for that particular agent or call participant. In addition, the user interface application 310 can allow an agent to select one of the associated zip tones and call events for further personalization. In one instance, the user interface application 310 can include menu items or widgets that allow an agent to select the already associated zip tone (e.g., a sequence of tones) and manipulate or adjust the parameters of the tones mentioned above such as frequencies, durations, volumes, etc. In another instance, the user interface application could allow the agent to define a zip tone. The menu items or widgets of the user interface application 310 would provide tools to specify a frequency and a duration of a tone. The agent could then build a sequence of tones to define a new zip tone which the agent can associate with the selected call event. To assist the agent in adjusting or defining the zip tones, the user interface application 310 can include capabilities to playback a zip tone to allow the agent to "preview" the personalized zip tone prior to finalizing association of the zip tone with a call event. Thus embodiments in accordance with the present disclosure allow customization of zip tones associated with call events likely to be encountered by an agent or call participant. The zip tones can include default zip tones defined by the system which are assigned or associated with a call event. Such default zip tones are used when no further customization or personalization is defined. Customized zip tones can be modified or created by an agent or other entity and define zip tones (other than a default zip tone) that are associated with a call event such as for a particular business group or group of related agents within a contact center enterprise. When present, customized zip tones are used in lieu of default zip tones. Personalized zip tones can be modified or defined by an agent and associated with a call event. The personalized zip tone includes further refinements that define a zip tone with a particular meaning that the agent associates with that zip tone and/or call event or defines a particular method to playback that zip tone in a manner that the agent prefers. When present, personalized zip tones are used in lieu of default or customized zip tones. In general, the user interface application 310 is described herein, as detailed above, as being the facilitator of the server 100A "receiving customization instructions" for zip tones or "requesting customization instructions" for zip tones. These zip tones can then be presented to a device of an agent or call participant just like typical (non-personalized or non-customized) zip tones are presented. As mentioned above, example customizations and personalization of zip tones, as discussed herein, can be described in the context of a Morse code environment. This environment, however, is provided by way of example and is more generically described as a code with symbols (e.g., a dot and a dash) such that a particular sequence of symbols represents a letter, or a word, or some other data that is indicative of a call event. A call event can, for example, include identifying a queue from which an incoming call is being received or an occurrence of some event during a conference call. Thus, the user interface application 310 would allow an agent to select a call event, the user interface application 310 would then display a number of available zip tones (or description) which identify a letter, a sequence of letters, or words. The agent can, as described above, select and associate a particular call event with one of the presented, possible zip tones. As a result, a call event (e.g., an incoming call transfer from a queue related to international reservations) can be associated with a zip tone that comprises a sequence of dots and dashes that correspond to the letters "I R". Initially, the series of dots and dashes can have a default playback rate, a default frequency or each tone, and a default volume. Further refinement or personalization of that zip tone can also be performed by the agent if desired.

The exemplary embodiments of this present disclosure have been described in relation to a contact center. However, to avoid unnecessarily obscuring the present disclosure, the preceding description omits a number of known structures and devices. This omission is not to be construed as a limitation of the scope of the present disclosure. Specific details are set forth by use of the embodiments to provide an understanding of the present disclosure. It should however be appreciated that the present disclosure may be practiced in a variety of ways beyond the specific embodiments set forth herein.

Furthermore, while the exemplary embodiments of the present disclosure illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications. Also, while the flowcharts have been discussed and illustrated in relation to a particular sequence of events, changes, additions, and omissions to this sequence can occur without materially affecting the operation of embodiments of the present disclosure.

A number of variations and modifications of the present disclosure can be used. It would be possible to provide for some features of the present disclosure without providing others.

For example, in one alternative embodiment of the present disclosure, the systems and methods of this present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present disclosure, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present disclosure is dependent on the speed and/or efficiency requirements of the system, the particular function, and the particular software or hardware systems or microprocessor or microcomputer systems being utilized.

In yet another embodiment of the present disclosure, the disclosed methods may be partially implemented in software that can be stored on a storage medium, executed on a programmed general-purpose computer with the cooperation of a controller and memory, a special purpose computer, a microprocessor, or the like. In these instances, the systems and methods of this present disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, it is not limited to such standards and protocols. Other similar standards and protocols not mentioned herein are in existence and considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

While much of the foregoing discussion relates to implementations on a server associated with an enterprise, it is to be appreciated that the user endpoint device would be capable of performing in the same manner. Standard networking circuits available on common user endpoint devices may be utilized for the receiving and transmission of data.

The foregoing discussion has been presented for purposes of illustration and description. It is not intended to limit the present invention to the form or forms disclosed herein. In the foregoing Detailed Description, for example, various features are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, though the disclosure herein has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Having thus described the present application in detail and by reference to embodiments and drawings thereof, it will be apparent that modifications and variations are possible without departing from the scope defined in the appended claims

What is claimed is:

1. A computer implemented method for providing zip tones for an ongoing call, the method comprising:
   receiving, by a computer of a contact center, from a device associated with a call participant of the ongoing call, customization instructions for one or more of a plurality of different zip tones;
   customizing, by the computer of the contact center, based on the customization instructions, the one or more of the plurality of different zip tones;
   receiving, by the computer of the contact center, during the ongoing call, a call-related event for the ongoing call;
   generating, by the computer of the contact center, one zip tone from among the plurality of different zip tones based on the call-related event received during the ongoing call, wherein the one zip tone is indicative of one or more attributes of the call-related event that are different than other call-related events; and
   transmitting, by the computer of the contact center, the one zip tone to the device associated with the call participant of the ongoing call.

2. The method of claim 1, wherein the ongoing call comprises a multi-party open bridge call and the call-related event is associated with a party joining or leaving the open bridge call.

3. The method of claim 1, wherein the call participant is an agent of the contact center.

4. The method of claim 1, further comprising:
concurrently transmitting, by the computer of the contact center, the one zip tone and an audio portion of the ongoing call to the device associated with the call participant.

5. The method of claim 1, wherein the customization instructions relate to a volume associated with playing back any of the plurality of different zip tones.

6. The method of claim 1, wherein the plurality of different zip tones are each uniquely encoded as multiple tones.

7. The method of claim 6, wherein the customization instructions relate to at least one of a relative duration of the multiple tones or a relative frequency of the multiple tones.

8. The method of claim 6, wherein the customization instructions relate to a playback speed of the multiple tones.

9. The method of claim 1, further comprising:
receiving, by the computer of the contact center, from a second device, the customization instructions, wherein the second device is not associated with the call participant of the ongoing call.

10. A system to provide zip tones for an ongoing call associated with a contact center, comprising:
a memory storing executable instructions;
a processor in communication with the memory, wherein the executable instructions when executed by the processor cause the processor to:
receive, from a device associated with a call participant of the ongoing call, customization instructions for one or more of a plurality of different zip tones;
customize, based on the customization instructions, the one or more of the plurality of different zip tones;
receive, during the ongoing call, a call-related event for the ongoing call;
generate one zip tone from among the plurality of different zip tones based on the call-related event received during the ongoing call, wherein the one zip tone is indicative of one or more attributes of the call-related event that are different than other call-related events;
transmit the one zip tone to the device associated with the call participant of the ongoing call.

11. The system of claim 10, wherein the ongoing call comprises a multi-party open bridge call and the call-related event is associated with a party joining or leaving the open bridge call.

12. The system of claim 10, wherein the call participant is an agent of the contact center.

13. The system of claim 10, wherein the processor when executing the executable instructions:
concurrently transmits the one zip tone and an audio portion of the ongoing call to the device associated with the call participant.

14. The system of claim 10, wherein the customization instructions relate to a volume associated with playing back any of the plurality of different zip tones.

15. The system of claim 10, wherein the plurality of different zip tones are each uniquely encoded as multiple tones.

16. The system of claim 15, wherein the customization instructions relate a relative duration of the multiple tones.

17. The system of claim 15, wherein the customization instructions relate to a relative frequency of the multiple tones.

18. The system of claim 15, wherein the customization instructions relate to a playback speed of the multiple tones.

\* \* \* \* \*